United States Patent
Levent-Levi et al.

(10) Patent No.: US 7,415,047 B1
(45) Date of Patent: Aug. 19, 2008

(54) METHODS FOR DETERMINING MULTIPLEX PATTERNS

(75) Inventors: Tsahi Levent-Levi, Givat Shmuel (IL); Oren Libis, Ramat-Hasharon (IL)

(73) Assignee: Radvision Ltd., Tel Aviv (IL)

( * ) Notice: Subject to any disclaimer, the term of this patent is extended or adjusted under 35 U.S.C. 154(b) by 499 days.

(21) Appl. No.: 11/005,407

(22) Filed: Dec. 6, 2004

(51) Int. Cl.
*H04L 12/28* (2006.01)
*H04H 20/28* (2008.01)
*H04J 3/02* (2006.01)
*H04J 3/16* (2006.01)
*H03M 13/00* (2006.01)

(52) U.S. Cl. ............... 370/537; 370/470; 370/486; 370/395.32; 714/755; 714/759

(58) Field of Classification Search ............ 370/470, 370/535, 536, 537, 538, 389, 474, 473, 522, 370/395.2, 395.31, 395.32, 412, 486, 487; 714/755, 752
See application file for complete search history.

(56) References Cited

U.S. PATENT DOCUMENTS

| | | | | |
|---|---|---|---|---|
| 6,310,591 B1 * | 10/2001 | Morgan et al. | ................. | 345/84 |
| 6,310,898 B1 * | 10/2001 | Schwartz | .................... | 370/537 |
| 7,020,824 B2 * | 3/2006 | Tanaka et al. | ............... | 714/755 |
| 7,120,162 B1 * | 10/2006 | Katibian et al. | ............. | 370/464 |

* cited by examiner

*Primary Examiner*—Hanh Nguyen
(74) *Attorney, Agent, or Firm*—Byrne Poh LLP

(57) ABSTRACT

Methods for determining multiplex patterns are provided. More particularly, a multidimensional data structure is used to store multiplex patterns and indexes used to access individual ones of those patterns based on audio channel selection, audio frame size, and what other media channels have frames pending. For example, when using a single audio channel, a two-dimensional look-up table maybe used to store multiplex patterns wherein one index is the audio frame size and the other index is an encoded value formed from bits representing whether any frames are pending for other corresponding media channels.

2 Claims, 2 Drawing Sheets

Figure 2:
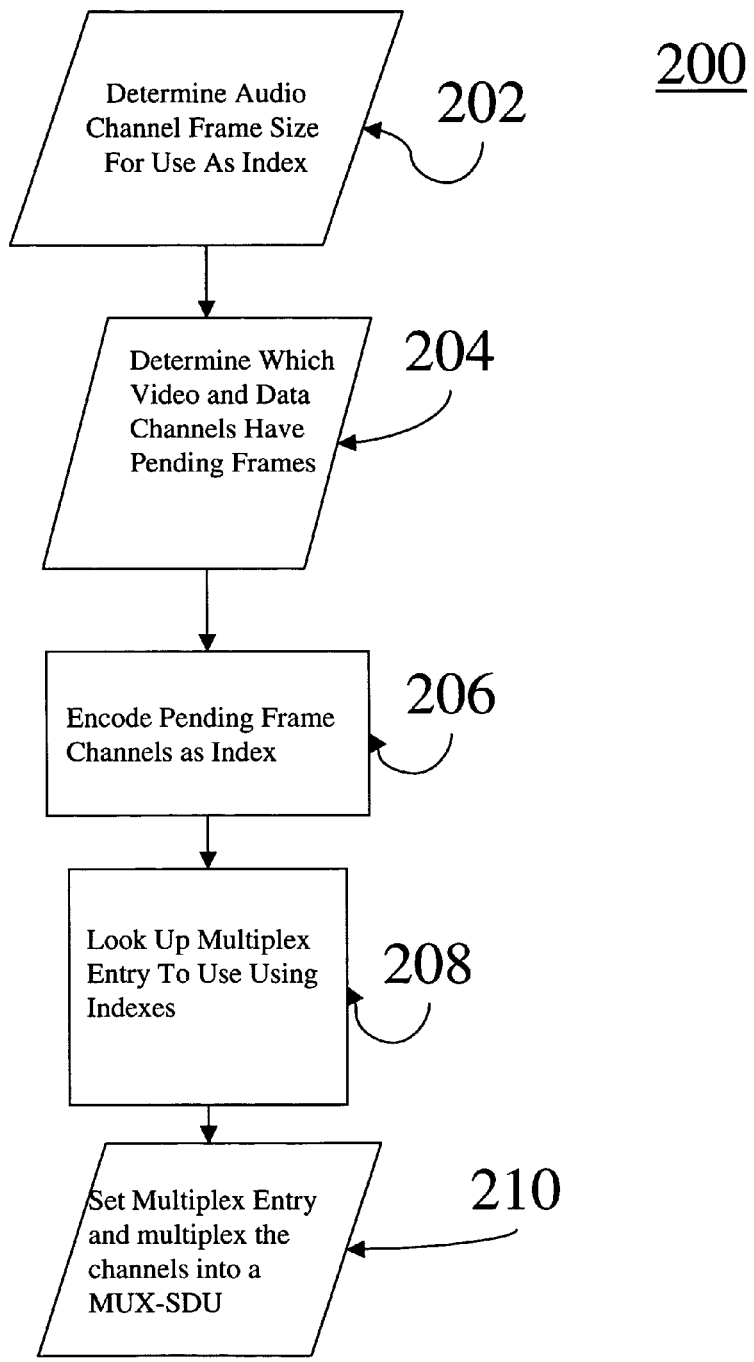

| | Index Encoded From Bits Representing Whether A Corresponding Frame Is Pending (Bit 0 – Video1; Bit 1 – Video2; Bit 2 – Data) | | | | | | | |
|---|---|---|---|---|---|---|---|---|
| | 000 | 001 | 010 | 011 | 100 | 101 | 110 | 111 |
| Audio Frame Size   0 | N/A | 2 | N/A | N/A | 3 | 8 | N/A | N/A |
| ... | 1 | 1 | N/A | N/A | 1 | 1 | N/A | N/A |
| 3 | 1 | 4 | N/A | N/A | 1 | 9 | N/A | N/A |
| ... | 1 | 1 | N/A | N/A | 1 | 1 | N/A | N/A |
| 7 | 1 | 5 | N/A | N/A | 1 | 5 | N/A | N/A |
| ... | 1 | 1 | N/A | N/A | 1 | 1 | N/A | N/A |
| 32 | 1 | 6 | N/A | N/A | 7 | 6 | N/A | N/A |
| ... | 1 | 1 | N/A | N/A | 1 | 1 | N/A | N/A |

Key:
0= H.245 Control
1= Audio Only
2= Video 1 Only
3= Data Only
4= Audio (size=3) + Video 1
5= Audio (size=7) + Video 1
6= Audio (size=32) + Video 1
7= Audio (size=32) + Data
8=No Audio + Video 1 + Data
9= Audio (size=3) + Video 1 + Data

|  | Index Encoded From Bits Representing Whether A Corresponding Frame Is Pending (Bit 0 – Video1; Bit 1 – Video2; Bit 2 – Data) | | | | | | | |
|---|---|---|---|---|---|---|---|---|
|  | 000 | 001 | 010 | 011 | 100 | 101 | 110 | 111 |
| Audio Frame Size | 0 | N/A | 2 | N/A | N/A | 3 | 8 | N/A | N/A |
| | ... | 1 | 1 | N/A | N/A | 1 | 1 | N/A | N/A |
| | 3 | 1 | 4 | N/A | N/A | 1 | 9 | N/A | N/A |
| | ... | 1 | 1 | N/A | N/A | 1 | 1 | N/A | N/A |
| | 7 | 1 | 5 | N/A | N/A | 1 | 5 | N/A | N/A |
| | ... | 1 | 1 | N/A | N/A | 1 | 1 | N/A | N/A |
| | 32 | 1 | 6 | N/A | N/A | 7 | 6 | N/A | N/A |
| | ... | 1 | 1 | N/A | N/A | 1 | 1 | N/A | N/A |

Key:  0= H.245 Control
1= Audio Only
2= Video 1 Only
3= Data Only
4= Audio (size=3) + Video 1
5= Audio (size=7) + Video 1
6= Audio (size=32) + Video 1
7= Audio (size=32) + Data
8= No Audio + Video 1 + Data
9= Audio (size=3) + Video 1 + Data

FIG. 1

METHODS FOR DETERMINING MULTIPLEX PATTERNS

BACKGROUND OF THE INVENTION

The present invention relates to communication standards for multimedia communication systems. More particularly, the present invention relates to methods for determining multiplex patterns in a third generation (3G) mobile communication system.

In recent years, much excitement has developed regarding the prospects for mobile communication systems with multimedia capability. For example, there is a great deal of public interest in the notion of a mobile telephone capable of transmitting and receiving both video and audio in real time—i.e., a mobile videophone.

The 3G-324M specification has been adopted to support real-time streaming of multimedia broadband wireless communication. The 3G-324M standard is a derivative of the ITU H.324 standard. The 3G-324M and ITU H.324 standards are hereby incorporated by reference herein in their entirety.

Within 3G-324M, various media streams may be defined. For example, such streams could include audio, video, data, speech, and control signals. In order to transmit these various media streams over a single transmission channel, 3G-324M uses the ITU-T H.223 multiplexing protocol. The ITU-T H.223 multiplexing protocol is hereby incorporated by reference herein in its entirety. H.223's basic function is to interleave the various media streams for transmission. Within this protocol, multiple multimedia packets are assembled into a single bit stream in accordance with a selected one of 16 available multiplex patterns.

In order to select the best one of the 16 available multiplex patterns, the H.324 and 3G-324M stacks loop over all the multiplex patterns and check which one fits the needs of the current frame being sent on the logical channels. This solution is problematic, however, in that it is overly complex and time consuming to loop through all of the multiplex patterns.

Thus, it is desirable to provide methods for determining multiplex patterns that do not loop through all available patterns.

SUMMARY OF THE INVENTION

In accordance with the present invention, methods for determining multiplex patterns are provided. More particularly, in the present invention, a multidimensional data structure is used to store multiplex patterns and indexes used to access individual ones of those patterns based on audio channel selection, audio frame size, and what other media channels have frames pending. For example, when using a single audio channel, a two-dimensional look-up table maybe used to store multiplex patterns wherein one index is the audio frame size and the other index is an encoded value formed from bits representing whether any frames are pending for other corresponding media channels.

In accordance with a first embodiment of the present invention, a method for determining multiplex patterns, comprising determining an audio channel frame size for an audio channel and using the size to form a first index, forming a second index representing which media channels have pending frames, looking-up a multiplex pattern based on the first index and the second index, and setting the multiplex pattern is provided.

In accordance with a second embodiment of the present invention, a method for determining multiplex patterns, comprising determining an audio channel frame size for an audio channel and using the size to form a first index, forming a second index representing which media channels have pending frames, forming a third index representing available audio channels, looking-up a multiplex pattern based on the first index, the second index, and the third index, and setting the multiplex pattern is provided.

BRIEF DESCRIPTION OF THE INVENTION

The present invention is described in further detail in conjunction with the following drawings in which like reference numerals refer to like parts throughout and in which:

FIG. 1 is an illustration of a two-dimensional look-up table that may be used to determine multiplex patterns in accordance with certain embodiments of the present invention; and FIG. 2 is a flow chart illustrating a process for accessing a two-dimensional look-up table that may be used to determine multiplex patterns in accordance with certain embodiments of the present invention.

DETAILED DESCRIPTION OF THE PREFERRED EMBODIMENTS

Turning to FIG. 1, an illustration of a two-dimensional look-up table in accordance with one embodiment of the present invention is shown. As can be seen, this table is indexed by audio frame size in one dimension (e.g., the "Y" axis) and is indexed by an encoded value in the other dimension (e.g., the "X" axis). The encoded value is an n-bit binary number, having bits 0 through n–1 (where bit 0 is the least significant bit and bit n–1 is the most significant bit), representing n channels of non-audio media that are available in the system in which the method of the present invention is being used. In the encoded value, when a channel is available, the corresponding bit is set to 1. Otherwise, the bit is set to 0. For example, for n equal to three, the channels may be Video1, Video2, and Data, where Video1 is represented by bit 0, Video2 is represented by bit 1, and Data is represented by 2. Thus, in this example, where the only channel of non-audio media that is available is Video1, the encoded value would be 001. Similarly, if both Video1 and Data media channels were available, the encoded value would be 101. Naturally, any suitable values and any suitable encoding scheme may be used in accordance with the present invention.

Once both of the indexes are known, the look-up table may be accessed to retrieve the multiplex code field (MC). As shown in FIG. 1, when the media channels that are available in addition to audio are Video1 and Data (and thus the encoded value is 101) and the audio frame size is 3, the multiplex pattern is 9. As can be seen from the Key of FIG. 1, this corresponds to an audio channel with size 3, video channel 1, and a data channel.

It should be apparent that any size two-dimensional table may be used to account for different combinations of audio frame size and available non-audio media channels.

Using such a two-dimensional table can also be used to express the priorities between the channels. In FIG. 1, for example, priority is given to Audio over all other channels and to Video over Data. This priority is decided by the Multiplex code field (MC) that is selected when no exact match is available. For example, in FIG. 1, when the audio frame size is 7 and media is available on both Video1 and Data, entry 5 is selected, which supports Audio and Video1, but no Data. In the same manner, the audio frame size of 10 always gives the selection of 1, which is sending Audio only, without any consideration of the other channels that have media to send.

As can be seen in FIG. 1, in certain cases all entries in a row or column of the table may be filled with 1, representing an audio-only channel. Although not shown in FIG. 1, in some cases, rows or columns filled with 1 (or any other default number or set of numbers) may be combined, or eliminated and replaced with suitable logic that assigns the default number when the corresponding indexes are presented. When no media channels other than an audio channel have frames pending, the encoded index for the "X" axis would be 000.

In cases in which more than one audio channel is provided, the two-dimensional table can be expanded to be a three-dimensional look-up table with each member of the "Z" axis representing a separate combination of audio channels. As with the "X" axis, these combinations may be encoded such that the each bit in an encoded "Z" axis value represents one of multiple audio channels that may be available and each bit is set to one when a channel is available and zero when not.

Turning to FIG. 2, a process 200 for determining multiplex patterns is shown. As illustrated, process 200 begins at step 202 where the audio channel frame size is determined for use as an index to the table. Next at step 204, process 200 determines which non-audio media (e.g., video and data) channels have pending frames. The availability of these channels is then used to encode an index to the table at step 206. The two indexes formed at step 202 and 206 are then used to access the table and retrieve a multiplex code field (MC) at step 208. Finally, the channels are multiplexed using the MC into a MUX-SDU at step 208.

As described above, in the case in which multiple audio channels are used, step 202 may be replaced with steps like steps 204 and 206 that determine which audio channels are being used and encode the availability of those channels to form an index.

It will be apparent to one of ordinary skill in the art that the present invention may be implemented with various modifications from the preferred embodiment described herein and that the scope of the invention is limited only by the claims that follow.

What is claimed is:

1. A method for determining multiplex code field (MC), comprising:
    determining an audio channel frame size for an audio channel and using the size to form a first index;
    forming a second index representing which media channels have pending frames;
    looking-up a multiplex pattern from a plurality of multiplex patterns based on the first index and the second index; and
    setting the multiplex pattern.

2. A method for determining multiplex code field (MC), comprising:
    determining an audio channel frame size for an audio channel and using the size to form a first index;
    forming a second index representing which media channels have pending frames;
    forming a third index representing available audio channels;
    looking-up a multiplex pattern from a plurality of multiplex patterns based on the first index, the second index, and the third index; and
    setting the multiplex pattern.

* * * * *